US005692123A

United States Patent [19]
Logghe

[11] Patent Number: 5,692,123
[45] Date of Patent: Nov. 25, 1997

[54] MAINTENANCE CHANNEL FOR MODULATOR, HIGHLY INTERCONNECTED COMPUTER SYSTEMS

[75] Inventor: Peter G. Logghe, Chippewa Falls, Wis.

[73] Assignee: Cray Research, Inc., Eagan, Minn.

[21] Appl. No.: 350,648

[22] Filed: Dec. 7, 1994

[51] Int. Cl.⁶ ................................................ G06F 11/00
[52] U.S. Cl. ........................ 395/185.01; 395/821
[58] Field of Search .................. 395/182.08, 182.09, 395/821, 185.01

[56] References Cited

U.S. PATENT DOCUMENTS

| | | | |
|---|---|---|---|
| 3,768,074 | 10/1973 | Sharp et al. | 340/172.5 |
| 3,919,533 | 11/1975 | Einolf, Jr. et al. | 235/153 |
| 5,253,359 | 10/1993 | Spix et al. | 395/575 |
| 5,319,775 | 6/1994 | Loges et al. | 395/575 |
| 5,434,997 | 7/1995 | Landry et al. | 395/575 |
| 5,502,812 | 3/1996 | Leyre et al. | 395/182.08 |
| 5,504,859 | 4/1996 | Gustafson et al. | 395/182.09 |

FOREIGN PATENT DOCUMENTS

| | | | |
|---|---|---|---|
| 0 515 253 A1 | 5/1992 | European Pat. Off. | G06F 15/16 |
| WO87/05724 | 9/1987 | WIPO | G06F 11/20 |

OTHER PUBLICATIONS

Research Disclosure, Dec., 1986, No. 272, New York, NY, USA, "An Efficient Fault-Tolerant Membership Protocol", No. 27257.

*Primary Examiner*—Jack B. Harvey
*Assistant Examiner*—David A. Wiley
*Attorney, Agent, or Firm*—Schwegman, Lundberg, Woessner & Kluth, P.A.

[57] ABSTRACT

A maintenance channel for modular computer system reset, configuration, partitioning, and error communication. The maintenance channel includes a sanity code channel to ensure module functionality. The maintenance channel configures the computer system and issues commands to modules using a command channel. Error detection and diagnostics are performed using an error channel. The maintenance channel provides independent processing groups within one computer system, and allows for partial powerdown or isolation of portions of the system without affecting operations in the active portions of the computer system.

12 Claims, 12 Drawing Sheets

MAINTENANCE CHANNEL FOR MODULATOR, HIGHLY INTERCONNECTED COMPUTER SYSTEMS

FIELD OF THE INVENTION

The present invention relates to computer systems and in particular to partitioning and control of modules in modular, highly interconnected computer systems.

BACKGROUND

Modularized, highly interconnected computing systems offer distributed memory modules and processing modules which can be separated and grouped for concurrent processing of different programs. Systems with a large number of processing elements are difficult to manage and control, since the large number of interconnected modules creates potential for both hardware and software failures. For instance, determination of active and functional modules is complicated by intermittent connections and connections to ports which appear connected or active when the ports are actually inactive.

There is a need in the art for a computer system which is easily reconfigurable and fault tolerant. Such a system should automatically detect faults and adapt for errors detected both in the hardware and the software during operation. There is also a need for a system which contains redundant intermodule control and communication paths with an ability to automatically reprogram the paths upon fault detection. Additionally, there is a need in the art for an arbitration system for intermodule control and communication.

SUMMARY THE INVENTION

The present invention addresses the aforementioned deficiencies of the prior art and solves other problems that will be understood and appreciated by those skilled in the art upon reading and understanding the present specification.

The present invention includes several embodiments which provide a method and apparatus for configuration and control of a highly interconnected, modular computer system. One embodiment of the present invention also offers a method and apparatus for completely independent processing groups. Such flexibility allows the operator to run different programs on a plurality of machines which are independent from both a software and a hardware perspective. Such a system is also highly configureable and fault tolerant, since modules can be associated with various working groups without the need to rewire the interconnections. The system also provides a method and apparatus for ensuring that the modules associated with a processing group are functional and provides means for bypassing defective modules.

A maintenance channel is provided which controls both software and hardware isolation of separate processing groups. The maintenance channel incorporates specialized cyclical signaling between modules to indicate module functionality and arbitrate module control. These signals are called sanity codes. They are a continuous handshaking between modules for the purposes of asserting control of a module and detecting when a module has erred, either due to software or hardware failure. The maintenance channel also features separate lines for command transmissions and for error message transmissions.

The sanity code method and apparatus provide a system for both hardware and software division of a modular computer system, and enable one partition of the machine to be deactivated while other partitions continue executing software tasks. The deactivation feature is useful to isolate portions of the computer for diagnosis, troubleshooting, repair, upgrade, or any other modification. Sanity codes also provide a system for automatically detecting defective modules and switching from a defective module to an operating module or re-routing necessary connections to continue processing without interruption. Sanity codes enhance system programmability and reconfiguration and provide a system for redundant intermodule control and communication paths.

One embodiment of the present invention provides a system of module communications using sanity codes to identify and isolate nonfunctional modules in the system within one clock period of module failure and continue processing uninterrupted by the failure.

One embodiment of the present invention also includes an error channel for transceiving error information between the modules.

BRIEF DESCRIPTION OF THE DRAWINGS

In the drawings, where like numerals describe like components throughout the several views.

DETAILED DESCRIPTION

In the following Detailed Description, reference is made to the accompanying drawings which form a part hereof and in which is shown by way of illustration specific embodiments in which the invention may be practiced. These embodiments are described in sufficient detail to enable those skilled in the art to practice and use the invention, and it is to be understood that other embodiments may be utilized and that electrical, logical, and structural changes may be made without departing from the spirit and scope of the present invention. The following detailed description is, therefore, not to be take in a limiting sense and the scope of the present invention is defined by the appended claims.

Figure 1A:
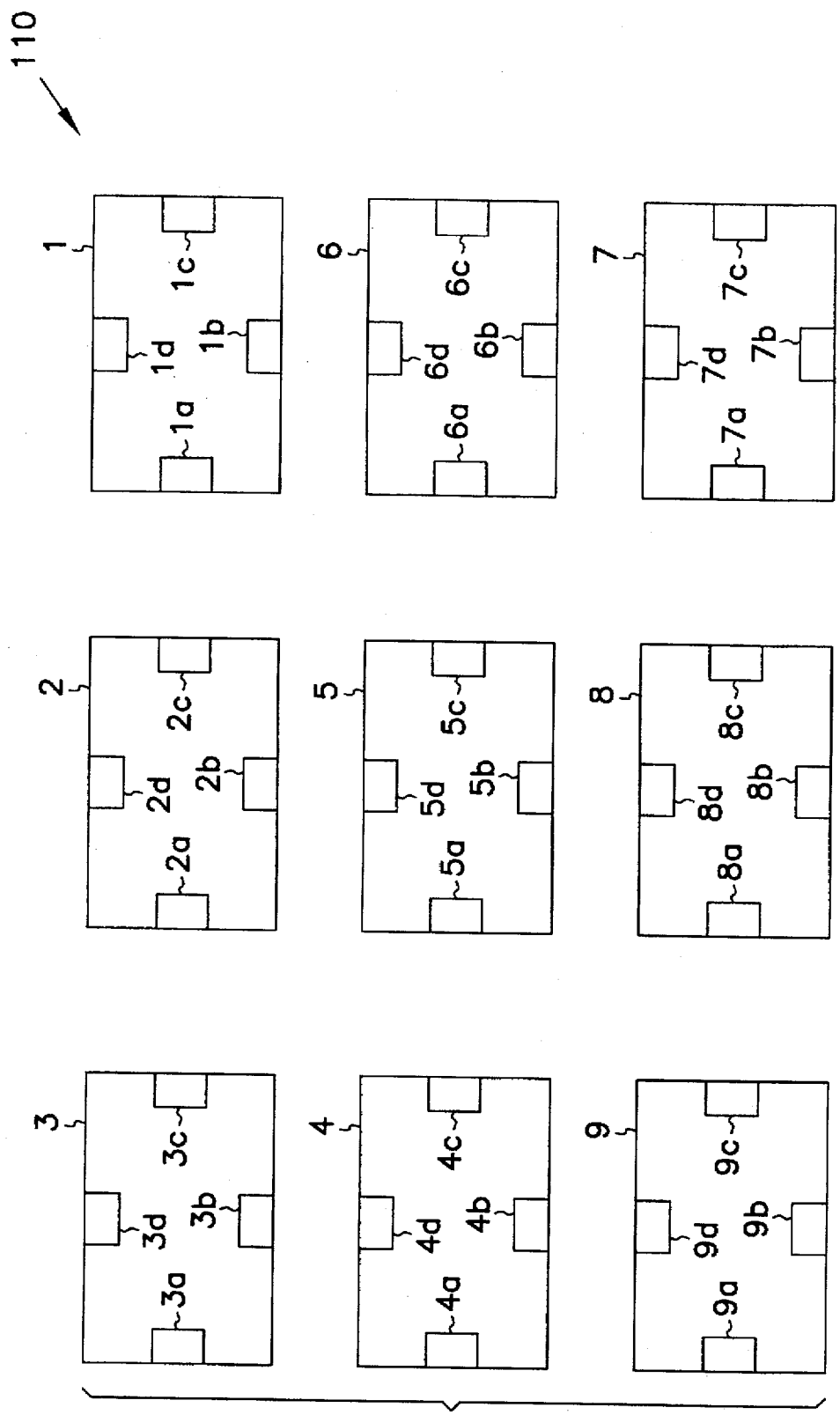
FIG. 1A is a block diagram of a modular computer system which is not partitioned or configured.

FIG. 1A demonstrates one embodiment of a computer system 110, featuring a collection of modules 1–9 which contain a plurality of ports 1a–1d through 9a–9d. Modules 1–9 perform various processing tasks, including processing, data storage, and input/output functions and may be connected in a variety of different configurations using the ports and a communication network.

Figure 1B:
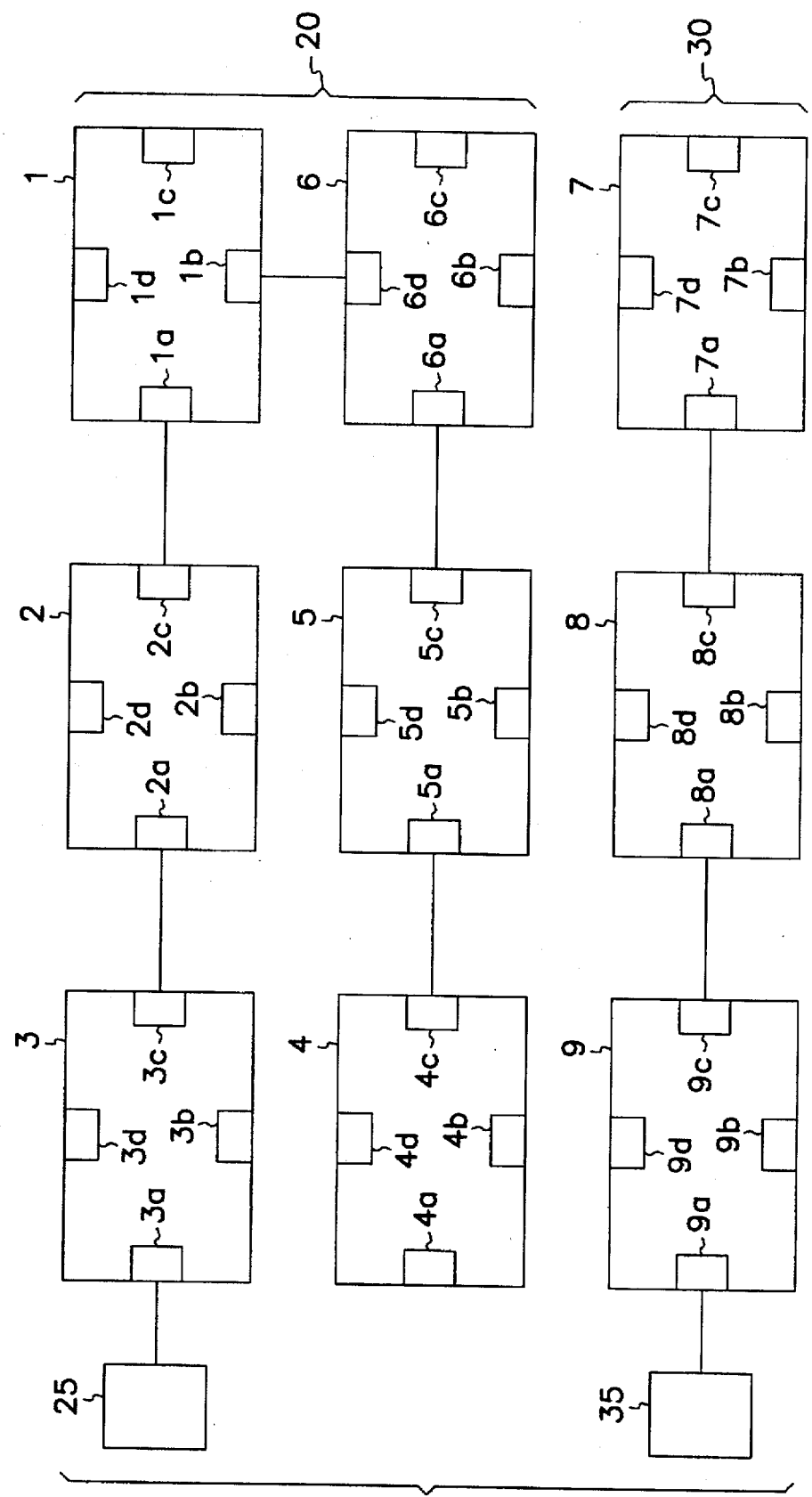
FIG. 1B shows one example of a partitioned computer system according to one embodiment of the present invention.

In a highly interconnected, modular computer system configuration is programmable with respect to intermodule control and communication. For example, referring to FIG. 1A, there are several possible configurations and interconnections of modules 1–9. FIG. 1B shows one embodiment where the computer 110 is divided into two processing groups comprising a first group of modules 1–6 and a second group comprising modules 7–9. Processing groups 20 and 30 fall on module boundaries, however, alternate embodiments include divisions of a module (intramodule boundaries). Control of processing group 20 is accomplished using control 25, which may be another module of the collection of modules or could be an external workstation. Similarly, control of processing group 30 is accomplished by control 35. In one embodiment of the present invention, the division represents two wholly independent computing systems, from both a hardware and software perspective. In such an embodiment, intermodule control and communication must be wholly independent between processing group 20, comprising modules 1–6, and the processing group 30, comprising modules 7–9. Therefore, if any hardware or software problems occur in the processing group 20, the operations of operating group 30 will not be interrupted. This embodiment allows computer system 110 to be divided into separate processing groups which are independent in both terms of software and hardware; they are separate computers. Those skilled in the art will readily recognize that variations in configuration and number and type of modules is possible without departing from the spirit and scope of the present invention.

Figure 1C:
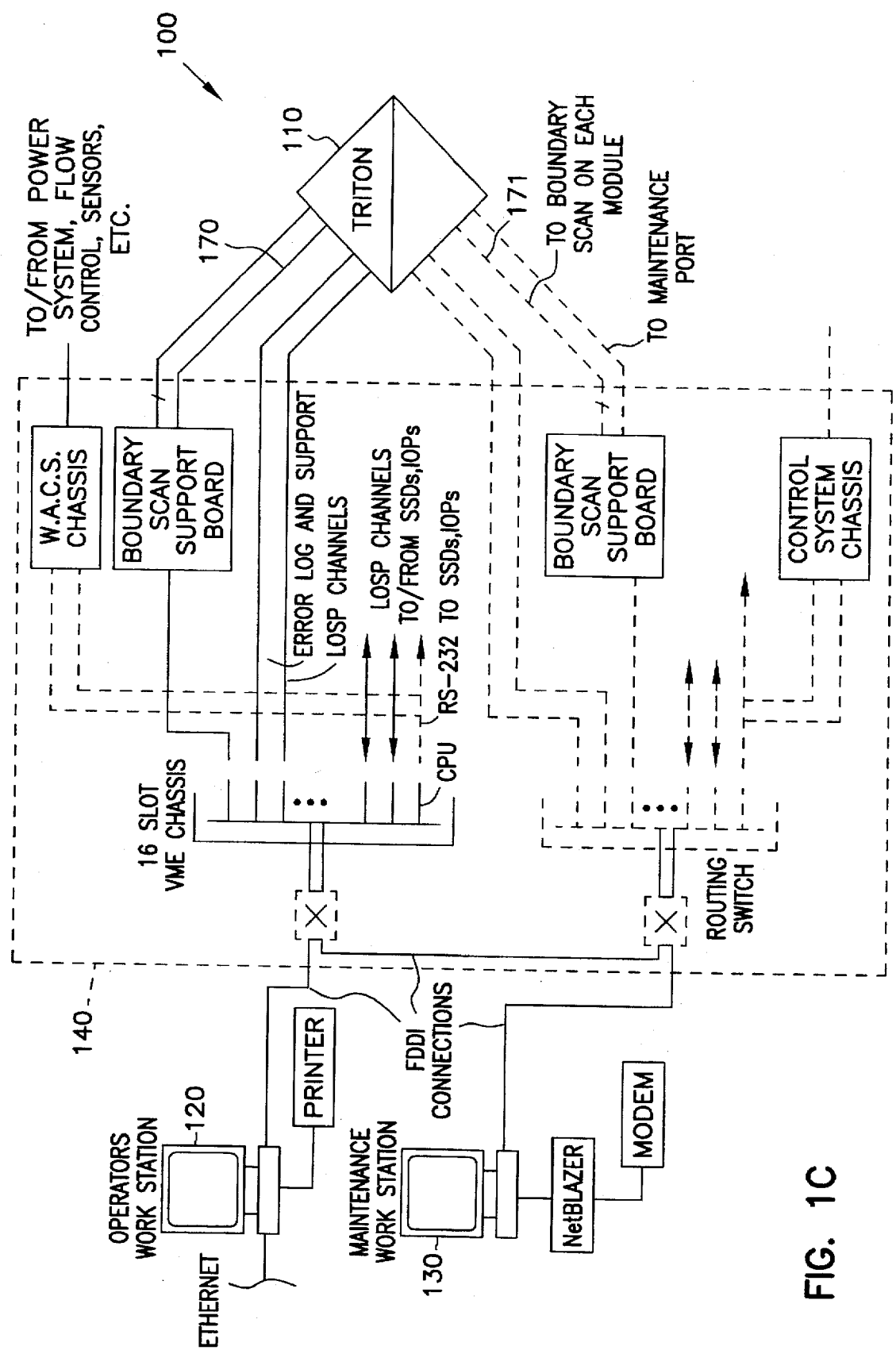
FIG. 1C shows one example of a maintenance workstation and maintenance channel for controlling a modular computer, according to one embodiment of the present invention.

FIG. 1C shows a modular, highly interconnected computing system 100 wherein computer 110 includes modules for processing, memory, input/output (I/O), and error detection. Interface electronics 140 connect the computer 110 to operator workstation 120 and maintenance workstation 130. Operator workstation 120 serves as a control panel for computer 110. Maintenance workstation 130 executes software which monitors computer 110 operation and issues commands to computer 110 over maintenance channel line 170 to configure computer 110 and to select hardware options available on computer 110, such as test points for diagnostics. Other embodiments feature a plurality of maintenance workstations 130 to support independent maintenance channels in computer 110. For example, a second maintenance channel line 171 is shown which provides a secondary configuration and control interface between a maintenance workstation and computer 110.

In one embodiment of the present invention the maintenance channel also provides control of computer system 110 using command transmit and receive lines. The command channel performs configuration, Master Clear controls of CPU and memory modules, system initialization, disabling sections of the system for powering, monitoring system activity, selecting test points for maintenance purposes, and initializing the system I/O resources. All of these different functions are accessed by sending an access code that addresses an individual option or chip in the system. In this embodiment, every chip in the system contains up to 128 soft switches, and 128 test point selects. Every function and configuration is controlled via the soft switches and the system testing and diagnostics use the test point selects to monitor system functionality. The soft switches also enable intramodule partitioning.

Maintenance Channel Signals

Figure 3:
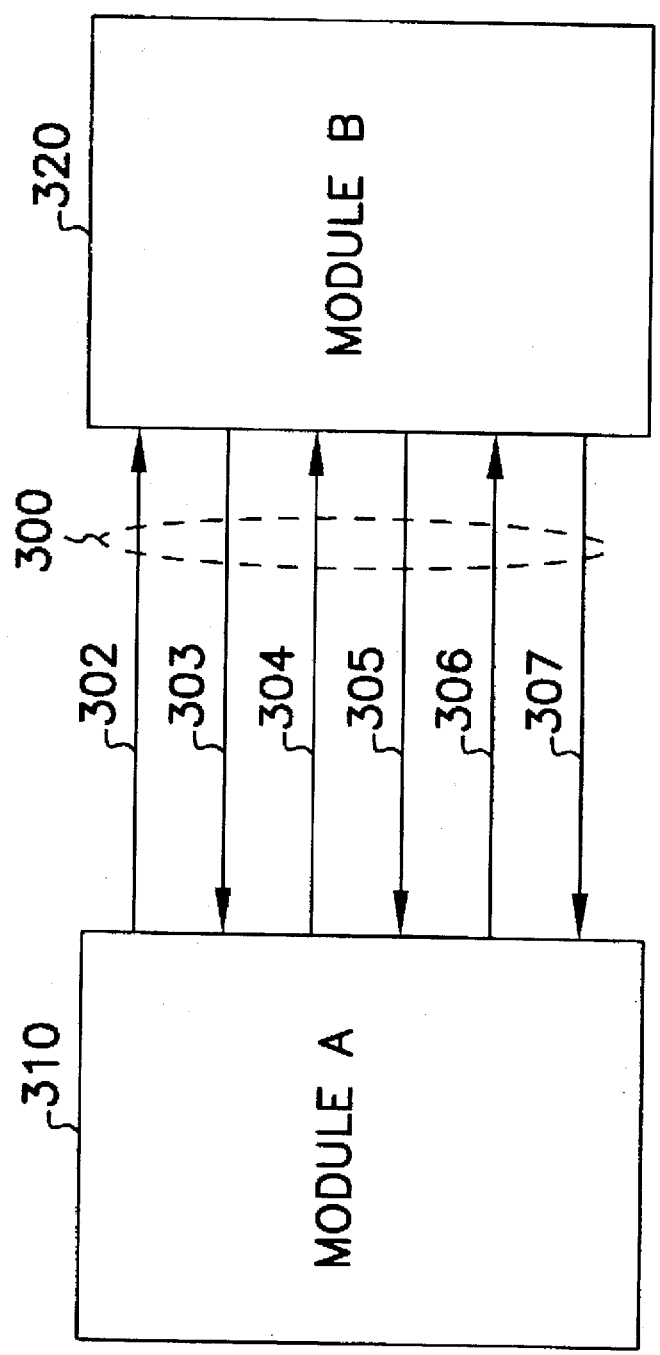
FIG. 3 is a detailed signal diagram of one embodiment of a maintenance channel interface.

One embodiment of maintenance channel line 170 is illustrated in FIG. 3. Two modules 310 and 320 are interconnected by maintenance channel 300. The maintenance channel 300 includes signals for sanity code transit 302 (module 310 transmitting to module 320), sanity code receive 303, command transmit 304, command receive 305, error signal transmit 306, and error signal receive 307. In multiport modules, these signals must be transceived from each port independently. Often, modules have several potential ports from which control signals can be received, however, the sanity code arbitration procedure (described below) is used to select a controlling or "master" port from the several candidates. Therefore, the intermodule communication and control can often be referred to as a master and slave relationship, since the module closer to the maintenance workstation in the sanity tree, the "master" module, is sending commands down the tree to the "slave" module.

Sanity Code Channel

One embodiment of the present invention provides each module with intelligent intermodule control and communication using a maintenance channel to manage the modules of a particular processing group and provide an interface to other processing groups without compromising the independence of its home processing group. In particular, each module is equipped to generate and detect a cyclical bit stream, called a sanity code, which identifies functional modules as opposed to nonfunctional modules. The sanity code serves as a continuous handshaking signal between a master module and its slave module(s) which indicates that the modules are operating correctly from both a hardware and software perspective.

The use of continuous sanity code generation prevents intermittent or inactive modules from transmitting garbage data to the rest of the system, since the sanity code generators and recognizers incorporated into the present invention are sensitive to intermittent or constant failures.

Sanity Tree Structures Using Sanity Codes

Figure 2:
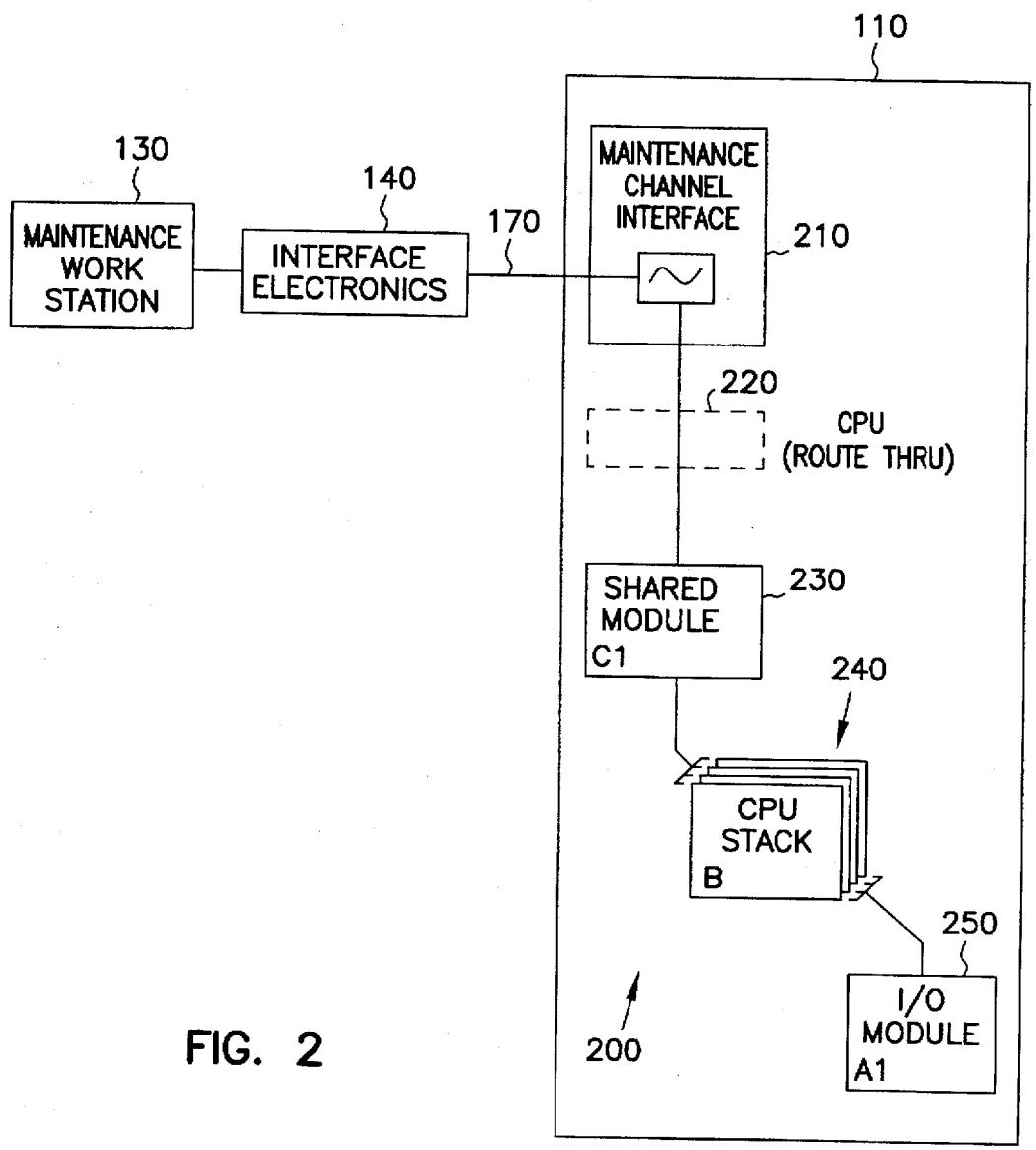
FIG. 2 is a detailed signal flow diagram of a sanity tree established by a maintenance channel according to one embodiment of the present invention.

FIG. 2 illustrates how a "tree" of modules are interrelated via the maintenance channel using sanity codes. In this embodiment, a maintenance workstation 130 executes software which selects a particular sanity code to be "programmed" into generator 210 via interface electronics 140 using a 24 bit seed value. The sanity code can be any predetermined cyclically redundant code. In one embodiment of the present invention, a six (6) bit repeating code of 110010 is used as one unique sanity code.

Maintenance channel information is distributed via the sanity tree structure, starting at the module where the maintenance workstation 130 is connected, and proceeding to computer 110 over maintenance channel line 170. The sanity code is generated by a sanity code generation hardware 210. A "sanity tree" is a series of interconnected modules which are logically active and controlled by a common maintenance channel. The sanity code system also requires the different parts of computer 110 to ensure sanity before allowing communication with those parts of the system. If, for example, module 240 does not receive a valid sanity code from module 230, then it will not communicate with module 230 and module 250.

One embodiment of the present invention features sanity code generation hardware on special modules. Therefore, the number of maintenance channels is limited to the number of special modules in the computer 110. Another embodiment of the present invention provides specialized sanity code generation hardware inputs for a plurality of maintenance channels. The embodiment shown in FIG. 2 features sanity code generation hardware 210 on shared module 230 with a direct route through the module microprocessor 220. The route through 220 is an optional means by which sanity code generator hardware can reside on a module and enter the sanity code signals into the module maintenance channel interface. Other hardware realizations of the sanity code generator are possible without departing from the scope and spirit of the present invention. For instance, maintenance workstation 130 could include a sanity code generator.

The maintenance channel controls the sanity codes to all the modules in the system, because it programs sanity code generation hardware 210 in order for it to properly send a valid code. The modules receiving the sanity code do not generate the sanity code, but retransmit the received sanity code. A single sanity code source ensures that each module of the tree is functioning properly, because the sanity code originates from one source and each module must operate properly to receive and retransmit the sanity code. A failure at any intermediate module in the sanity tree causes a collapse of the modules beneath it (modules receiving a sanity code from the failing module will cease receiving the sanity code upon failure of that module). If another module is reconfigured in place of the failing module, the modules below the failing module receive the proper sanity code sequence and the sanity tree structure is preserved.

The maintenance channel configures the sanity tree by issuing a command to each module over the command channel which instructs the module to retransmit the sanity code to other modules in the computer 110. This command enables the maintenance channel to activate or idle portions of the system. Therefore, access to various parts of the system to set memory configurations, CPU numbers, etc., is restricted until a sanity code is sent to each module to be configured.

In one embodiment, the integrity of the system is protected by causing all inactive modules to stay in a reset state until activated by another module transmitting a valid sanity code. This prevents the module from transmitting garbage information until it is formally connected to the sanity code tree. It also ensures an orderly start-up of the modules in computer 110, or portions thereof. Each module is initially activated in a default mode, unless instructed otherwise by the command channel.

Commands generated by the maintenance workstation 130 follow the sanity tree structure. For example, referring to FIG. 2, sanity code generation hardware 210 is programmed by maintenance workstation 130 over maintenance channel line 170 to generate a sanity code. The sanity code is transferred to module 230 via route through 220 so that module 230 receives the proper sanity code from sanity code generation hardware 210. Communication between maintenance workstation 130 and module 230 is established once module 230 returns the proper sanity code to the sanity code generator hardware 210. Once this communication is established, module 230 is programmed to pass on the sanity code to module 240. Communication is established between modules 230 and 240 once module 240 begins transmitting the proper sanity code to module 230. Then module 240 is programmed to transmit the sanity code to module 250. Module 250 retransmits the sanity code to module 240 and communication is established with module 250. A slave module will not return the proper sanity code to the master module if it is not functioning properly.

In this way, a tree structure is established and access follows this hierarchy. Individual modules are programmed using route codes which are discussed further in the section entitled "Command Channel Operation", below. Once a continuous connection of sanity code authorization is established, configuration, or diagnostic and test point control commands can be sent to the modules using the route codes. One embodiment of the present invention allows for re-routing the connections of each module by special commands over the command lines once initial control of the module is asserted and communications are established using the maintenance channel. Therefore, an operator at the maintenance workstation controls module interconnections once the modules are under maintenance channel control. Automatic reassignment of the modules is also possible as a routine operating system function. Finally, if a plurality of maintenance channels exist on the system 110, then the operators may exchange working modules without compromising the security and independence of their associated working groups.

The flexibility of establishing the tree structure at configuration time enables the maintenance workstation to bring up a system in any combination of module interconnection. No tree structure is fixed by the hardware and therefore, partially configured and partially populated systems can be powered up, instead of the entire machine. This allows an operator to place a portion of the system under test, while running several other operations with the remaining portions of the system. The operator may also test different operating systems on independent maintenance channels.

Arbitration of Sanity Code Control of Modules

As the system powers up, modules are activated and the remaining inactive modules receive a number of potential sanity codes signals from interconnected active modules. An arbitration scheme is necessary to ensure that a module which is being powered up is associated with another module in an orderly fashion.

Arbitration is also necessary for modules which are being reallocated. Reallocation of a module takes place (1) voluntarily, by a master module relinquishing control of a slave module or (2) involuntarily, by master module failure, in which case the slave modules are deactivated due to the loss of sanity code generation, unless a new source of sanity code is established.

Figure 4:
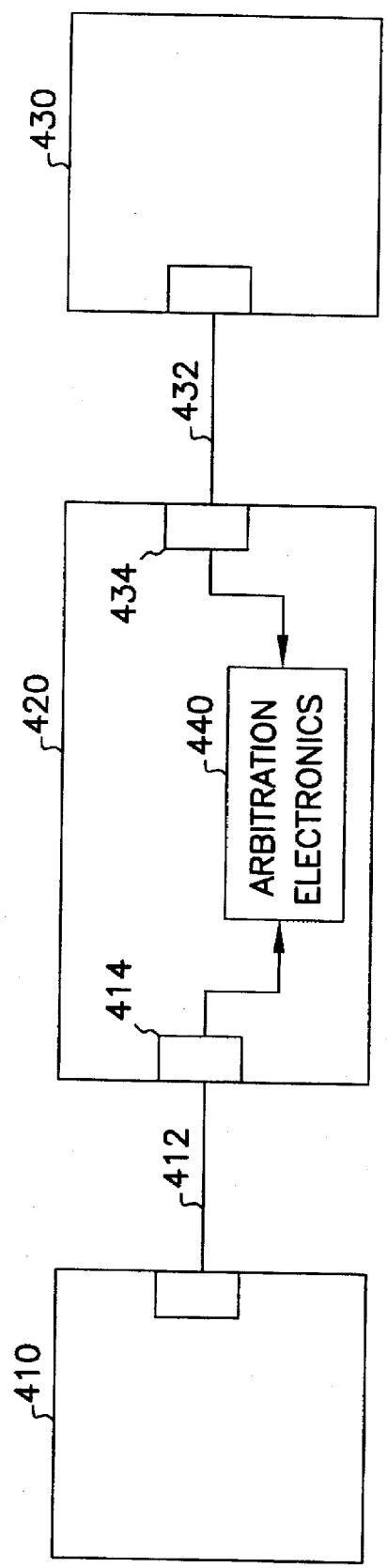
FIG. 4 shows a portion of a modular computer system and the interconnection of adjacent modules to a sanity code arbitration system, according to one embodiment of the present invention.
Figure 5:
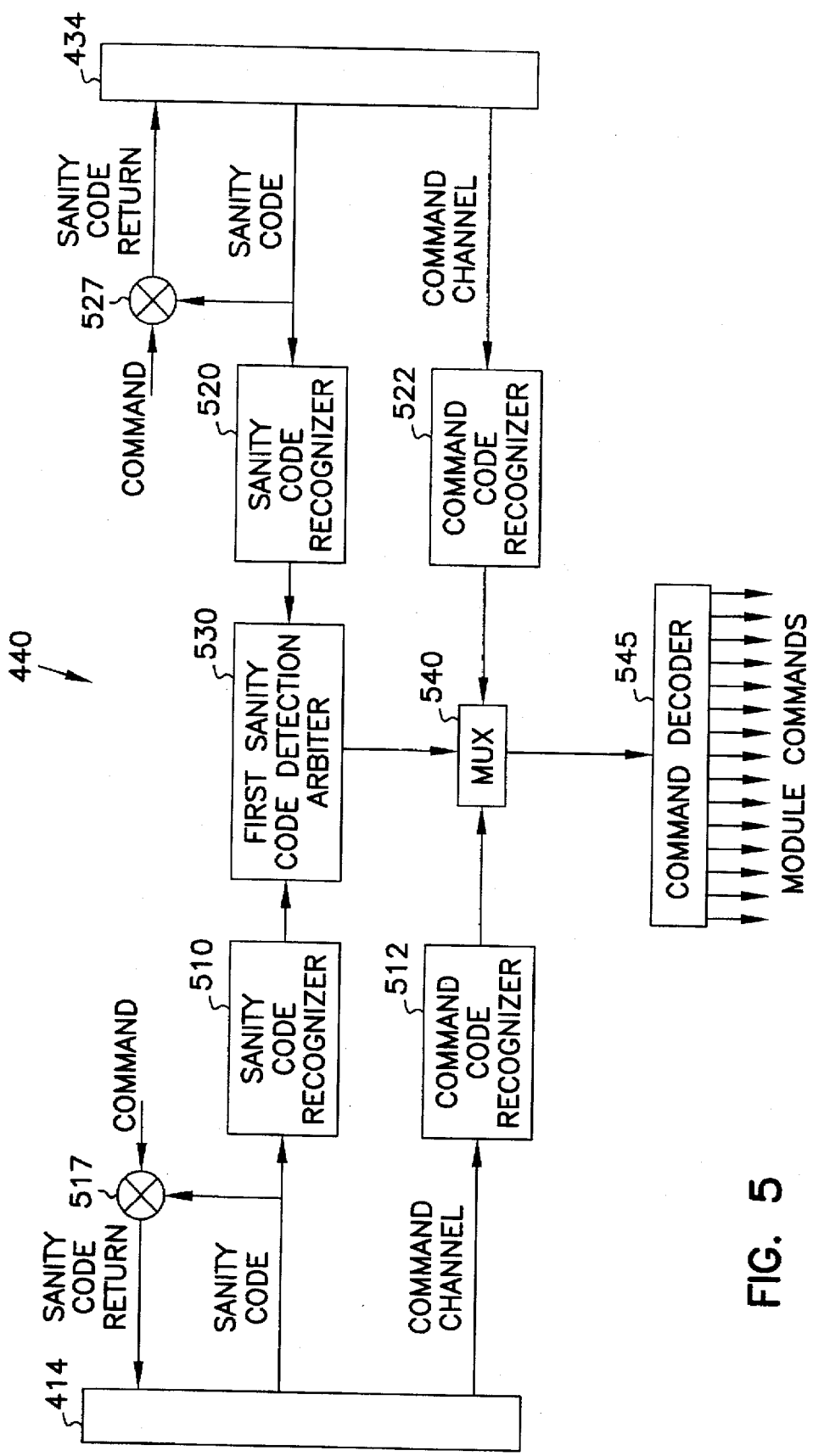
FIG. 5 shows a detailed flow diagram of one embodiment of a sanity code arbitration and retransmission system.

In FIG. 4, modules 410 and 430 are active and sending sanity codes across maintenance channels 412 and 432, to ports 414 and 434, respectively. Module 420 is inactive and must decide which sanity code to accept. One embodiment of the arbitration electronics 440 is shown in FIG. 5.

Arbitration electronics 440 comprise sanity code recognizers 510 and 520 for sanity code inputs from ports 414 and 434, respectively. Command code recognizers 512 and 522 also receive commands from ports 414 and 434. In one embodiment of the present invention first sanity code detect arbiter 530 detects the fast valid sanity code and command combination arriving at module 420. Control of the module 420 is given to the first interconnected module providing a valid sanity code and retransmit command. For instance, if control is given to port 414 (module 410 of FIG. 4), then multiplexer 540 passes commands from command code recognizer 512 to command decoder 545. The incoming module commands may include a command to close switch 517 to return a sanity code to the transmitting module (module 410, in this example). If port 434 (module 430 of FIG. 4) received control, then multiplexer 540 passes commands from command code recognizer 522 to command decoder 545. The incoming module commands may include a command to close switch 527 to return a sanity code to the transmitting module (module 430, in this example).

Alternate embodiments include re-arbitration commands to allow a module re-negotiate control to another master module. For example, in one embodiment of the present invention, the controlling maintenance channel rearbitrates control of the module by sending a command to arbitration electronics 440 to retransmit the sanity code of the opposite channel, to transfer control to the other module. For instance, if module 410 had control of module 420, instead of closing switch 517, a command could be sent by the maintenance channel 412 to close switch 527, thereby re-arbitrating control to module 430 (and maintenance channel 432).

Other arbitration modes are possible without deviating from the scope and spirit of the present invention. For example, sanity codes could be hierarchical in nature such that one code would have precedence over the other in arbitration situations.

The previous embodiment describes arbitration in a two port module, however, the methods and apparatus taught can be extended to arbitration in an n-port module without departing from the scope and spirit of the present invention.

Sanity Code Generation

Figure 6:
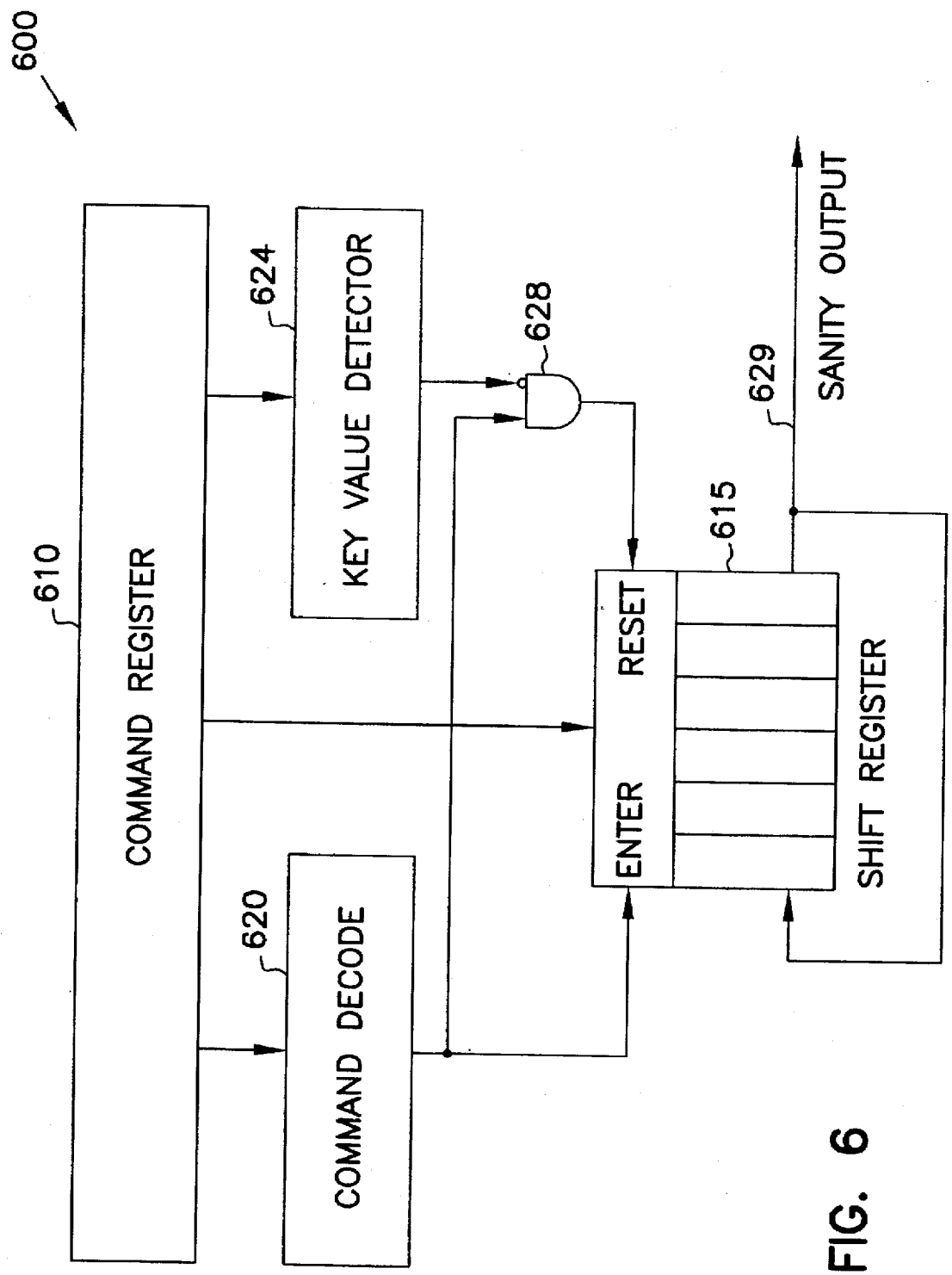
FIG. 6 is a logic flow diagram of one embodiment of a sanity code generation system.

FIG. 6 shows one embodiment of a sanity code generation method and apparatus, according to the present invention. Sanity code generator 600 of FIG. 6 is included in sanity code generation electronics 210 of FIG. 2. The command to start sanity code generation is captured in command register 610. Command decoder 620 detects a request to start the sanity code generator 600, and enters a portion of the command into shift register 615. Concurrently, key value detector 624 compares the remaining portion of the command in command register 610 to an expected value. If the proper value in register 610 is not detected, then command decoder 620 will force gate 628 to reset shift register 615. If the proper value is in command register 610, then shift register 615 will not be reset and the bit pattern in shift register 615 will recirculate and the sanity code is repeated at output 629 at the appropriate sanity code pattern and rate.

Those skilled in the art will recognize that variations in number of bits used for sanity code generation and other variations in sanity code generation are possible without departing from the scope and spirit of the present invention.

Sanity Code Recognition

Figure 7:
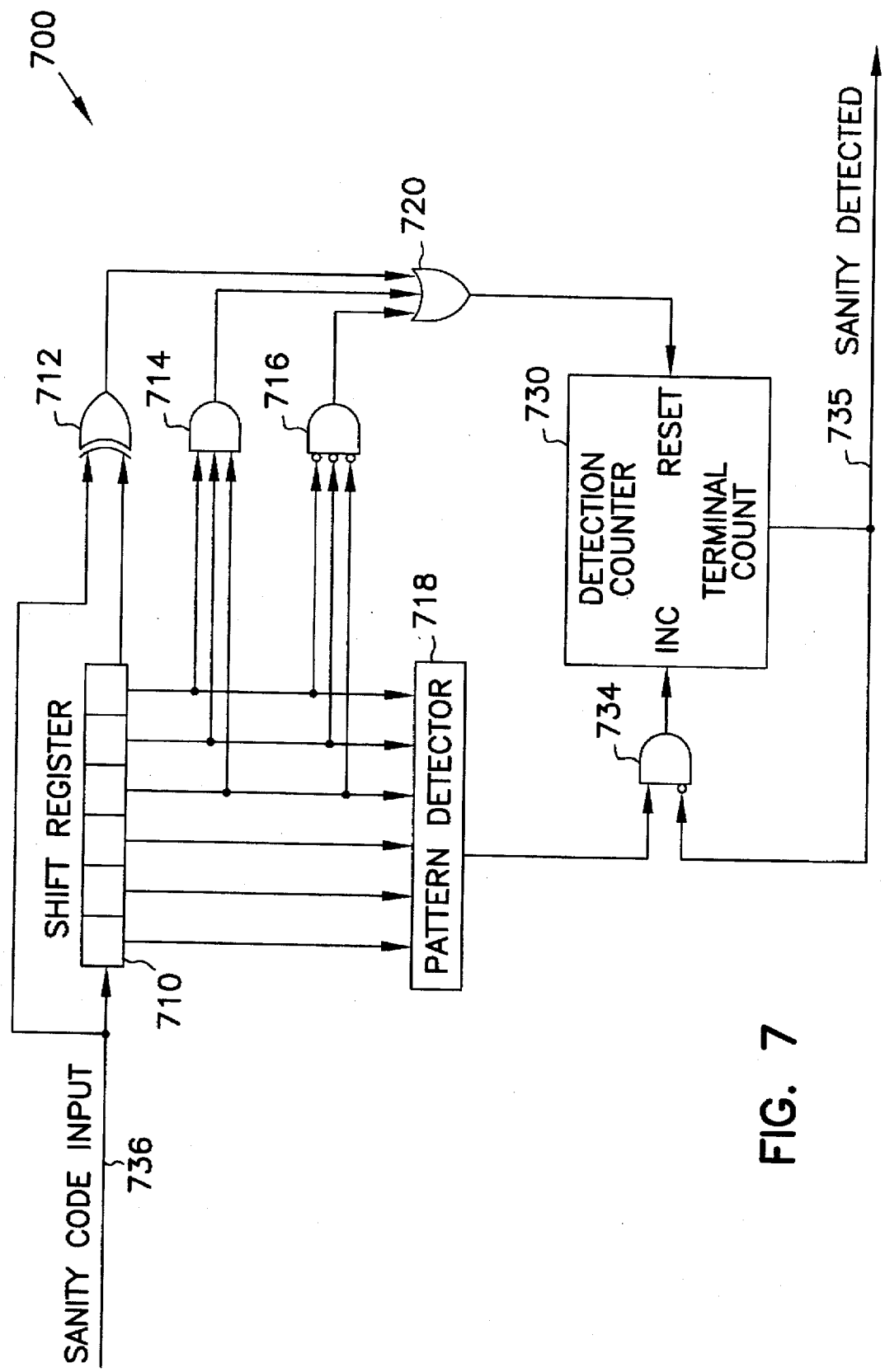
FIG. 7 is a logic flow diagram of one embodiment of a sanity code detection system.

Sophisticated detection methods detect a sanity code error within one bit. This allows a slave module to reconfigure a signal path around a defective master module without interruption in processing. FIG. 7 shows one embodiment of a sanity code recognizer 700. Sanity code recognizer 700 could be used for sanity code recognizers 510 or 520 of FIG. 5. In this embodiment the sanity code to be detected arrives at shift register 710. If a valid code is detected for an adequate number of cycles, output 735 is set to logical one to signal a valid sanity code to its module.

Shift register 710 accumulates a six bit pattern from sanity code input 736 and pattern detector 718 compares the accumulated bit pattern to an expected sanity code. Upon detection of a valid sanity code, pattern detector 718 increments detection counter 730 via AND gate 734 if the terminal count of detection counter 730 has not been reached. If detection counter 730 has reached terminal count, signalling a valid sanity code on output 735, then AND gate 734 prevents further incrementing of detection counter 730.

Three inputs to OR gate 720 reset detection counter 730, either resetting a valid sanity code signal on output 735 or preventing a terminal count of detection counter 730. AND gate 714 will output a logical one if the received pattern contains more consecutive logical ones than the predetermined sanity code allows. If the pattern contains more consecutive zeros than expected, then AND gate 716 (with inverted inputs as shown in FIG. 7) will output a logical one. EXCLUSIVE-OR (XOR) gate 712 detects if the received pattern does not repeat at the same cyclical rate as the length of shift register 710. If any of the gates 712, 714, or 716 outputs a logical one value OR gate 720 will output a logical one and reset the detection counter 730, which prevents detection counter 730 from signalling a valid sanity code at output 735.

A continuous stream of valid sanity codes generate a terminal count of detection counter 730 and a valid sanity code signal at output 735. One embodiment of the present invention analyzes 16 repetitions of 6 bit cycles to verify that the module is indeed active and not intermittently transmitting the proper sanity code. The value of the terminal count may be increased or decreased to vary the required number of sanity code cycles to be received before outputting a valid sanity code signal to the module. Those skilled in the art will recognize that variations in the number of bits used in the sanity code and in the binary code detection system will not deviate from the spirit and scope of the present invention.

Sanity Code Resynchronizers

It is essential in systems with multiple sources of control to have resynchronizers so that when the system is powered up and the modules are communicating over the maintenance channel the sanity codes are temporally synchronized between the master and slave circuit. This allows a seamless handoff without loss of continuity in case of a failure or re-arbitration. It avoids having a discontinuity in the sanity code which would be detected downstream by other dependent modules and result in a collapse of the tree structure down the sanity tree.

Figure 8:
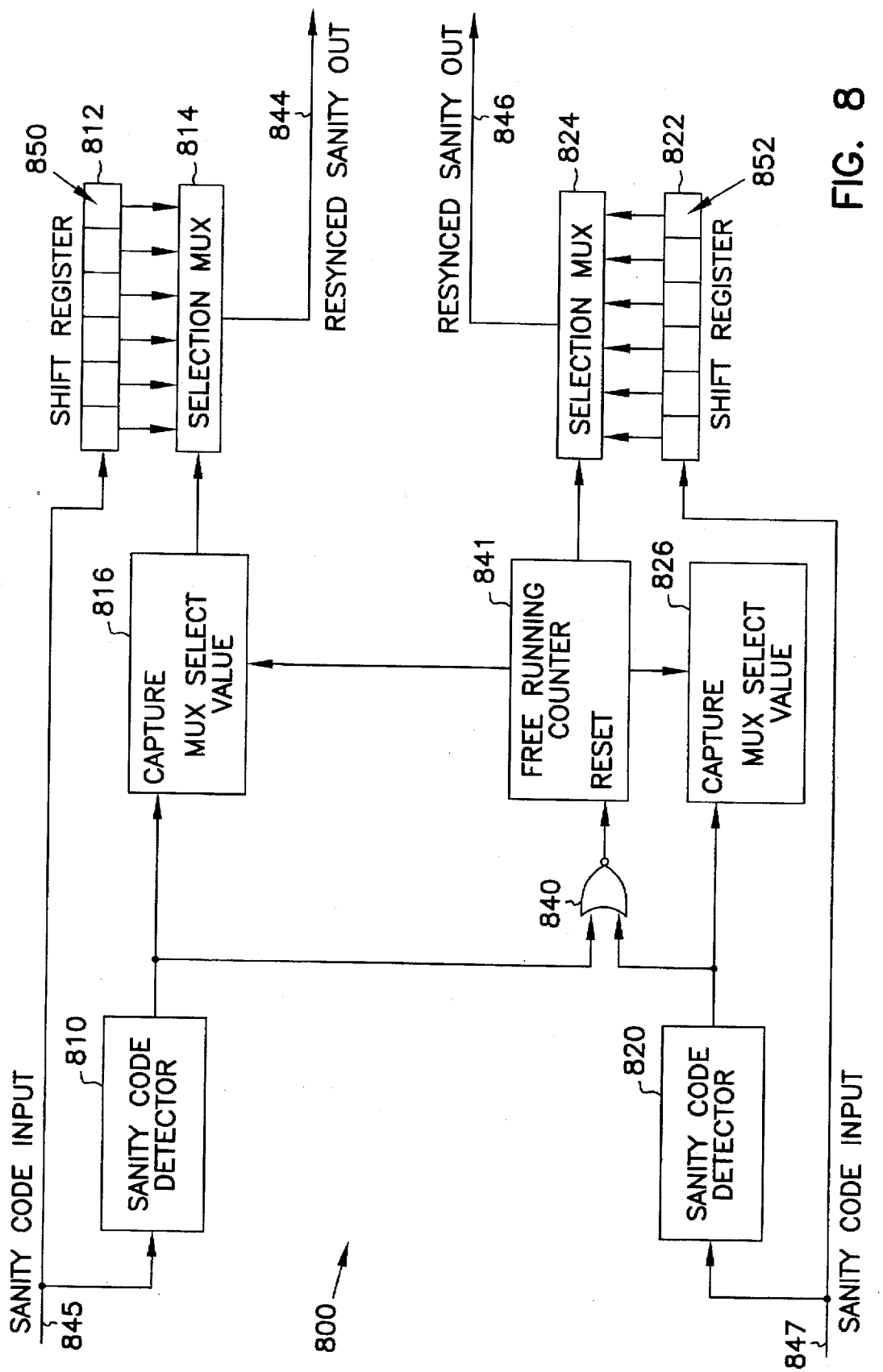
FIG. 8 is a logic flow diagram of one embodiment of a sanity code resynchronizer system.

FIG. 8 shows one embodiment of a sanity code resynchronizer 800. Sanity codes which arrive on input 845 and are received by detector 810. Sanity codes arriving on input 847 are received by detector 820. Assuming that no valid codes have been received by detectors 810 and 820, NOR gate 840 forces counter 841 (which is free running, and cycles in counts equal to the number of bits in a sanity code pattern) into a reset state. When either of the detectors 810 or 820 detects a valid sanity code, counter 841 will begin free running, and the relative bit shift between the sanity codes will be captured when the second detector receives a valid sanity code.

For example, assume that a valid sanity code arrives on input 845 and is detected by detector 810. Since this was the first detection, the value of the free running counter 841 (which was previously reset) will be at zero, which is captured at register 816. Register 816 directs multiplexer 814 to the zeroth tap of shift register 812 labeled as input 850, thus selecting a non-shifted output for output 844. Assuming a valid sanity code is detected 2 clock periods later at input 847 by detector 820, then register 826 will capture a two (2) value and multiplexer 824 will connect the second tap of shift register 822, labeled as 852, to output 846. This positioning of taps places the sanity code bit-streams in synchronization. Therefore, all the sanity code outputs from a resynchronizer 800 are identical after resynchronization.

One application of a resynchronizer is to synchronize sanity codes received from different sources to prevent a loss of proper sanity code input in case of a voluntary or involuntary handoff by the master module.

Partitioning and System Configuration

The sanity trees formed by intermodule linkage via the sanity code are responsible for establishing a command structure to the modules. In one embodiment, however, hardware switches and options installed in each module are the means for partitioning the system into separate and independent hardware processing groups. Once a tree of modules is initialized using the sanity code, the commands issued to them from the maintenance workstation 130 over the maintenance channel program the modules and their interactions with other modules. The programming consists of setting soft switches and initializing options to control the intermodule communication. The maintenance channel provides a combination of the sanity code and the command channel to enable processing groups to operate independently from both a software and hardware perspective in the computer 110. Therefore, the sanity codes provide a system which establishes contact with select modules, and ensures continued, faultless control and communication with those modules. The command channel directly programs the modules, which enables the modules to be easily reconfigured while simultaneously providing independent hardware operation of each processing group.

Command Channel Operation

Figure 9:
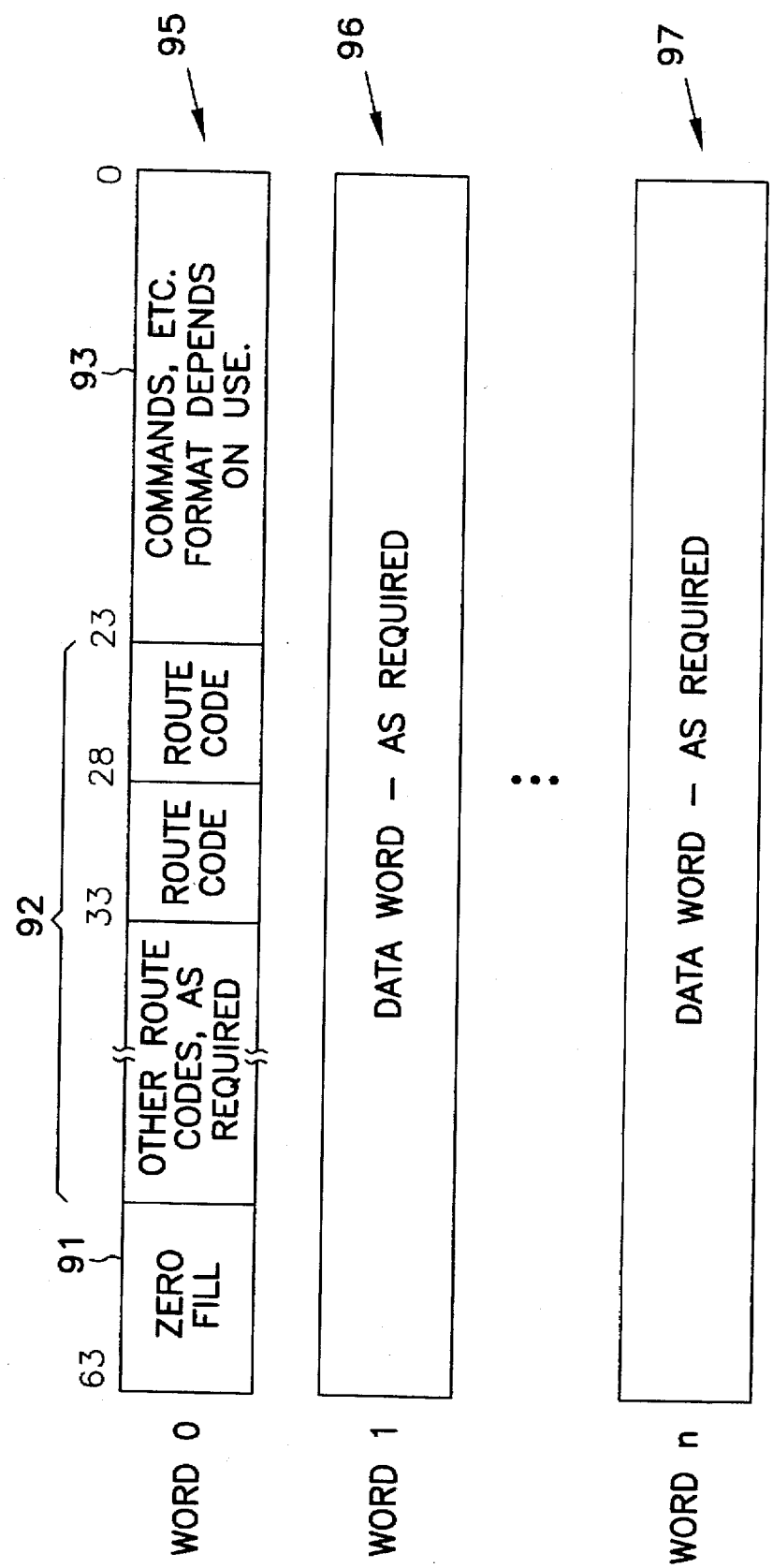
FIG. 9 is a block diagram of one embodiment of a command word format according to one embodiment of the present invention.

In one embodiment of the present invention messages and commands are sent to the various modules in the sanity tree using the command channel of the maintenance channel interface. Messages and commands are sent using a route code prefix to address the message or command to the correct module in the tree. Route codes are systematically stripped from the message or command as they travel down the tree from the maintenance channel to the target module. FIG. 9 shows one embodiment of the format for maintenance channel messages and commands. Segment 93 of word 95 contains command and message information. Words 96 through 97 are added as needed for each command in a predetermined format. A greater number of words may be added without departing from the scope and spirit of the present invention. Route codes in route segment 92 precede the message and command data in word 95. In this embodiment individual route codes are 5 bits long. The remainder of the word is filled with zeros 91.

The route codes are used in routing the message from module to module down the sanity tree and are stripped off the front end of the route segment 92 and zeros are padded in. As the message or command is sent down the tree the modules look for the first non-zero character to signify the beginning of the route code.

Route Code Forwarder/Stripper

Figure 10:
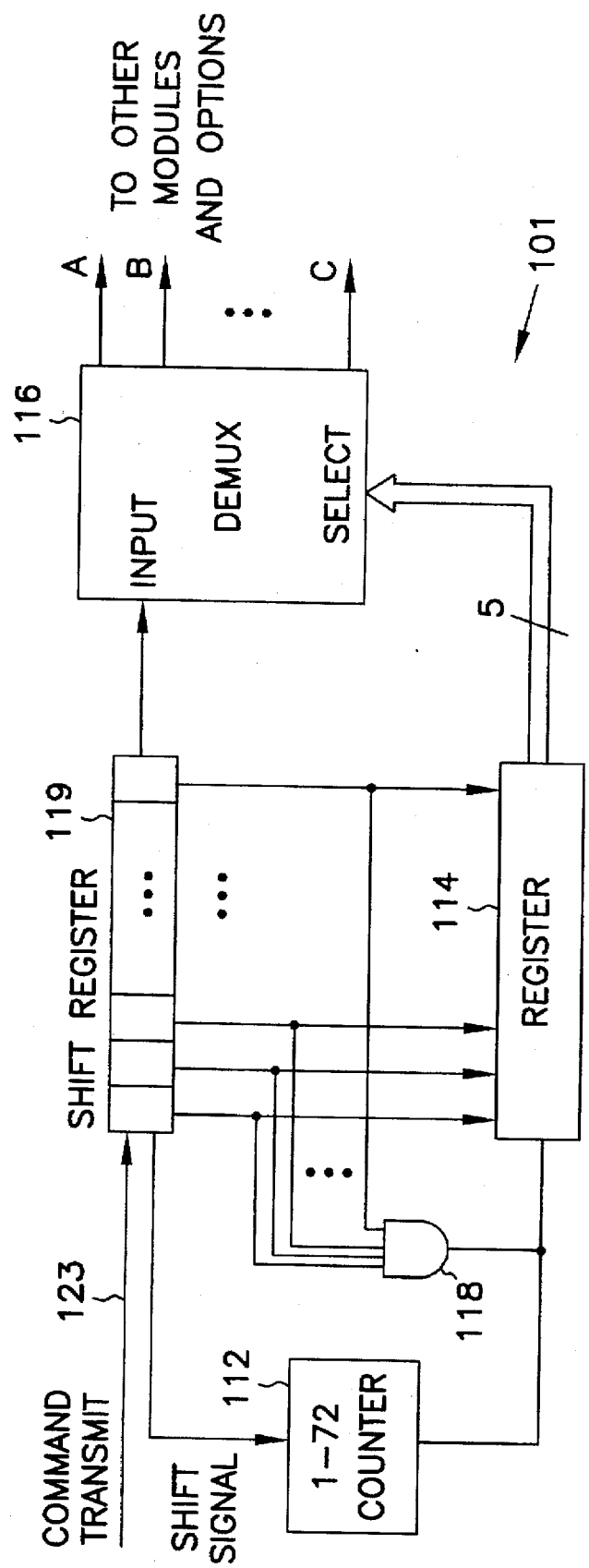
FIG. 10 is a logic flow diagram of a command code stripper/forwarder according to one embodiment of the present invention.

FIG. 10 shows one embodiment of a route code forwarder/stripper 101. Shift register 119 receives an incoming serial data maintenance channel message on input 123. Upon detection of the first non-zero bit counter 112 receives shift pulses from shift register 119. When the count equals 5, the shift register 119 contains the leading route code which is forwarded to register 114. The routing code in register 114 drives the demultiplexer 116 to direct the remaining bit stream to another module or to an option on the present module. The bit stripping function is not shown in FIG. 10. A special condition occurs when gate 118 detects an octal 37 it does not enter the route code into register 114 and does not strip the route code from the route segment 92 (of FIG. 9). This is because octal 37 is the code for a continuation route code. The continuation route code is designed to follow the same trail followed by the prior maintenance channel message, and is used as a header for data words 1 through N (96 through 97, as shown in FIG. 9), when necessary.

Counter 112 may count to any number over 64, since the number of bits in the basic maintenance channel message format is 64 bits, plus the five potential bits used for the continuation route code. Therefore, the 72 is in excess of 69, which is the total worst case number of bits traveling through in one maintenance channel message word.

One advantage in using the demultiplexer 116 to route commands and messages is that if the sanity tree structure is known, then all addresses for any option or module on the tree are relative and an extra absolute addressing scheme to uniquely identify each module is unnecessary.

Addressing Options on the Modules

The routing codes may be used to address different options on a module. For example, the codes may be stacked to address different soft switches on a module. Uses for soft switches include:

1. Setting configurations of the system;
2. Setting diagnostic modes in the system; and
3. Setting the test points of the system.

Commands sent over the command channel are used to configure each module in the sanity tree. If no configuration is sent to the modules, then they are activated in their default mode (after proper sanity code interchange is established). The routing codes can direct a message or command to a particular chip on a particular module. The routing codes and messages can also be encoded to read or toggle a test point or program a diagnostic mode.

Error Code Channel

The maintenance channel also includes error transmit and receive lines to communicate error and diagnostic information between the maintenance workstation and the module(s) under test. The maintenance channel design allows for multiple maintenance workstations to operate on the system for purposes of system diagnostic maintenance and testing. For example, one half of the machine can be shut down and transfer all the memory of that portion to the other half of the machine for purposes of powering down certain modules or doing some other repairs or diagnostics. The system has total flexibility as to allocation of modules between said maintenance channels, and may reconfigure in several different ways.

Another aspect of the present invention is that it may be programmed to be self-reconfiguring. For example, if two maintenance channels are sharing control of the entire system, and one of the maintenance channels catastrophically fails or shuts down, this allows the other maintenance channel using the sanity codes, the sanity code recognizers and resynchronizers can continuously and seamlessly arbitrate and retain control of the entire system by the maintenance workstation which is still functional (without even one clock cycle of interruption or dead time). One embodiment of the present invention also offers "spare" or alternate modules which may be switched into operation upon failure detection of an existing module. Such modules may also be configured into a processing group if, for example, extra memory or extra processing is required by the processing group. The configurability of this embodiment of the present invention allows for rapid and automatic exchange of modules without the need for hardwired reconfiguration.

Other embodiments of the present invention are possible without departing from the scope and spirit of the present invention. Other embodiments of this system provide greater than two independent process groups using independent sanity codes. For example, in one embodiment the maintenance channel transmits a second specialized tester sanity code which informs the module under test that a diagnostic will be performed on it. Other embodiments provide intermodule control and communication using greater or fewer maintenance channel lines.

Yet another embodiment of the present invention requires that the cycling sanity codes be detected with edge sensitive devices to ensure that even a momentary loss of module communications is sensed. Rapid cycling and monitoring of sanity codes enables the system to detect errors quickly and reconfigure around a faulty module to prevent loss of the sanity tree.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

We claim:

1. A modular computer system, comprising:
   a plurality of modules for processing, storage, input/output, and error checking operations, wherein each module has at least one port for communications with other modules;
   an interconnection network, connected to the ports of the plurality of modules;
   a sanity code generator; and
   a maintenance interface, connected to one of the plurality of modules, using sanity codes to control the modular computer system configuration, operation, and diagnostics;
   wherein each module of the plurality of modules includes a sanity code recognizer for recognizing valid sanity codes and a sanity code retransmitter for retransmitting received, valid sanity codes.

2. The system of claim 1 wherein each module further comprises a sanity code arbitrator.

3. The system of claim 1 wherein each module further comprises a sanity code resynchronizer.

4. The system of claim 1 wherein each module further comprises a command code recognizer.

5. The system of claim 1 wherein each module further comprises a route code stripper/forwarder.

6. A method of intermodule control and messaging in a modular, highly interconnected computer system, the computer system comprising a plurality of modules and an interconnection network, the method comprising the steps of:
   providing a maintenance station;
   generating a sanity code based on commands from the maintenance station;
   transmitting the sanity code to other modules of the system; and
   activating modules which receive and retransmit a valid sanity code.

7. The method of claim 6 further comprising the step of:
   enabling command communications and error communications only to activated modules.

8. The method of claim 6 wherein the sanity code is periodic.

9. The method of claim 8 wherein the sanity code is repeated at a sufficient rate to detect intermittent module connections.

10. A method for configuration and partitioning of a modular computer system, the computer system comprising a plurality of modules and an interconnection network to provide communications between modules, the method comprising the steps of.
    activating a sanity code generator in the computer system to transmit a first valid sanity code;
    activating modules which receive and validate the first sanity code;
    sending commands to activated modules to enable retransmission of the valid first sanity codes; and
    sending configuration commands to active modules from the maintenance station.

11. The method of claim 10 further comprising the steps of:
    transmitting a second sanity code, the second sanity code being unique from the first sanity code; and
    generating separate sanity trees, wherein the separate sanity trees comprise modules activated by the first sanity code and the second sanity code, respectively.

12. A maintenance channel for a modular computer system, the computer system comprising a plurality of modules and an interconnection network to provide communications between modules, the maintenance channel comprising:
    a sanity code generator;
    a sanity code detector;
    a command code generator;
    a command code decoder;
    an error code generator; and
    an error code decoder.

* * * * *

UNITED STATES PATENT AND TRADEMARK OFFICE
CERTIFICATE OF CORRECTION

PATENT NO. : 5,692,123

DATED : November 25, 1997

INVENTOR(S) : Peter G. Logghe

It is certified that error appears in the above-indentified patent and that said Letters Patent is hereby corrected as shown below:

On the title page item [54], delete "Modulator" and insert --Modular--.

Col. 1, line 2, please delete "Modulator" and insert --Modular--.

Signed and Sealed this

Twenty-first Day of July, 1998

Attest:

BRUCE LEHMAN

*Attesting Officer*     *Commissioner of Patents and Trademarks*